United States Patent [19]
DeWall

[11] Patent Number: 6,161,954
[45] Date of Patent: Dec. 19, 2000

[54] MUD MIXING MACHINE AND COUPLER

[76] Inventor: Harold O. DeWall, 1138 Lehner Ave., Escondido, Calif. 92026

[21] Appl. No.: 09/348,805

[22] Filed: Jul. 7, 1999

Related U.S. Application Data

[63] Continuation-in-part of application No. 09/201,218, Nov. 30, 1998, Pat. No. 6,116,769.

[51] Int. Cl.⁷ ...................................................... B28C 7/02
[52] U.S. Cl. ................................ 366/43; 366/51; 366/65; 366/98; 366/100; 366/201; 366/249; 366/250; 366/251; 366/252; 366/254; 366/282; 366/283; 366/308; 403/315; 403/331; 403/353; 464/16; 464/158
[58] Field of Search ................................ 366/43, 51, 65, 366/98, 100, 191, 201, 241, 249, 250, 251, 252, 254, 282, 283, 308, 331; 403/315, 331, 353; 464/16, 158

[56] References Cited

U.S. PATENT DOCUMENTS

| | | |
|---|---|---|
| 2,114,127 | 4/1938 | Neuberth . |
| 4,692,028 | 9/1987 | Schave ........................................ 366/22 |
| 5,570,953 | 11/1996 | DeWall ........................................ 366/10 |
| 5,878,925 | 3/1999 | Denkins et al. ........................ 222/608 |
| 5,885,001 | 3/1999 | Thomas ................................... 366/308 |

*Primary Examiner*—Matthew O. Savage
*Assistant Examiner*—Michael A. Fleming
*Attorney, Agent, or Firm*—Loyal McKinley Hanson

[57] ABSTRACT

An apparatus for mixing powdered or premixed drywall joint compound and water to form a joint compound mixture or slurry includes a portable container rig with a container, pumping components, and mixing components on a dolly. A mixing element rests within the container upon the container bottom, while a mixing element driver assembly that is adapted to rest upon the upper lip portion of the container engages the mixing element and rotates it for mixing purposes while at the same time raising it slightly. The pumping components may include various commercially available valves and pump outlets that facilitate the filling of various tape application tools, and one preferred embodiment includes remote control components featuring automatic pump turnoff. One embodiment includes a multifunction coupling assembly having an upper coupling component and two different lower components. An operator uses the first lower coupling component when he desires to leave the mixing element in the container after mixing a batch of mud. The operator uses the second lower component when he desires to remove the mixing element from the container after mixing the batch of mud.

5 Claims, 7 Drawing Sheets

MUD MIXING MACHINE AND COUPLER

CROSS REFERENCE TO RELATED APPLICATION

This application is a continuation in part of the copending U.S. patent application by the same inventor that was filed Nov. 30, 1998 and assigned Ser. No. 09/201,218 now U.S. Pat. No. 6,116,769.

BACKGROUND OF THE INVENTION

1. Technical Field

This invention relates generally to construction equipment, and more particularly to a machine for mixing and dispensing a drywall joint compound or other such slurry.

2. Description of Related Art

Drywalling construction crews commonly use gypsum wallboard, or "drywall," to construct walls and ceilings. They affix drywall panels to studs and then fill and coat the joints between panels with a joint compound mixture they prepare onsite by mixing a premixed joint compound (or "mud") with water. The premixed joint compound is a damp viscous mixture with a consistency something like putty. Adding water thins it to a suitable consistency for use. After the joint compound mixture is prepared and applied it hardens, and then workers sand it to produce a smooth joint surface.

Premixed joint compound is well known to drywalling crews and is commercially available from various sources. By way of example, the premixed joint compound available form National Gypsum Company of Charlotte, N.C. under the trademark GOLD BOND is packaged in a plastic liner within a three to five gallon box. A worker mixes a batch of the joint compound mixture by emptying the premixed joint compound into a pail, adding water, and stirring for the desired consistency. He either stirs it by hand using a tool that looks something like a large potato masher, or he uses an electric drill with a mixing tool in the chuck.

After mixing, the worker dispenses the joint compound mixture from the pail to selected drywall taping and finishing tools. He typically uses an existing type of hand operated loading pump to fill other existing automatic taping tools, finishing tools, and compound distribution tools and components. Those tools are well known in the trade and they are sold under various trademarks, including those sold under the trademark AMES by Ames Tools, Supplies, and Service of Duluth, Ga., those sold under the trademark TAPETECH by TapeTech Tool Co., Inc. of Union City, Calif., and many others.

The problem is that the mixing procedure is time consuming and messy. The worker must suspend his other high-skill drywalling activities while he mixes the next batch of joint compound mixture and otherwise attends to the joint compound mixing and distribution process. So, drywalling crews need a better way to mix and dispense joint compound.

SUMMARY OF THE INVENTION

The invention described in the parent application (09/201, 208) addresses the problems outlined above by providing an apparatus for mixing and dispensing joint compound mixture that includes a portable container rig outfitted with an electrically powered mixing and dispensing arrangement. A mixing element is included that automatically lifts off the bottom of the container when rotated. An electrically powered stator tube pump distributes the mixed compound through standard valves and outlets. One embodiment includes a handheld remote controller that further facilitates distribution to taping tools.

Thus, the invention described in the parent application facilitates joint compound mixing and distribution for more efficient use of worker time. Workers can continue to work while the apparatus mixes the next batch. Mixing is less messy and the apparatus speeds up the entire drywall finishing process. To paraphrase some of the claim language appearing in the parent application, an apparatus for mixing premixed joint compound and water to form a joint compound mixture includes (i) a container, (ii) a motor driven pump assembly, (iii) a mixing element, (iv) a mixing element driver assembly with a motor driven drive shaft, and (v) a coupling adapted to couple the drive shaft to the mixing element while raising the mixing element above the base of the container slightly.

The invention described in this continuation-in-part application improves upon the foregoing by providing a multifunction coupling assembly having an upper coupling component and two different lower components. The first lower coupling component is used with a first, larger mixing element in a larger container (e.g., 7.5 gallon bucket) where it is desired to leave the mixing element in the container after mixing a batch of mud. The second lower component is used with a second, smaller mixing element in a smaller container (e.g., 5 gallon bucket) where it is desired to remove the mixing element from the container after mixing the batch of mud. The upper coupling component engages the first lower coupling component in a way that raises the mixing element slightly during mixing but then disengages the lower coupling component after mixing so that the mixing element remains in the container. The upper coupling component engages the second lower coupling component in a way that raises the mixing element slightly during mixing and holds onto the lower coupling component after mixing so that the mixing element can be lifted out of the container. The following illustrative drawings and detailed description make the foregoing and other objects, features, and advantages of the invention more apparent.

DESCRIPTION OF THE PREFERRED EMBODIMENTS

The description of the preferred embodiments begins with a description of a mud mixing machine or apparatus 10 with reference to FIGS. 1–6 of the drawings as set forth in the parent application. A multifunction coupling assembly constructed according to the invention of this continuation-in-part application is then described with reference to FIGS. 8–15. A reader already familiar with the specification and FIGS. 1–6 of the parent application may proceed directly to the description of the multifunction coupler assembly.

Mud Mixing Machine.

Figure 4:
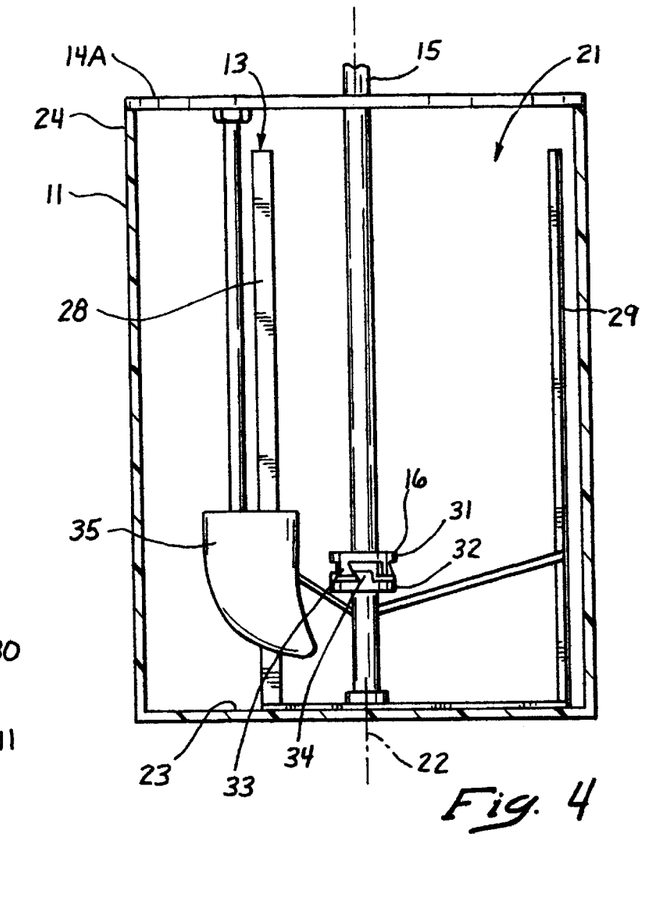
FIG. 4 is an elevation view of the mixing element in a lowered position resulting when no rotational power is applied to the drive shaft.
Figure 5:
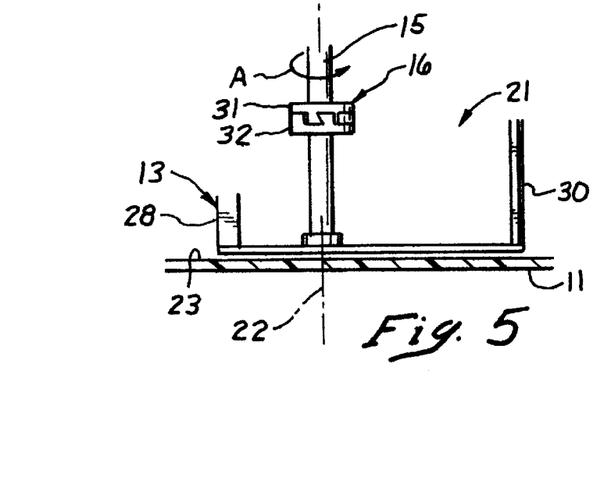
FIG. 5 is an elevation showing the mixing element lifted to a raised position resulting when rotational power is applied to the drive shaft.

FIGS. 1–5 show various aspects of a mud mixing machine or apparatus 10 constructed according to the invention for mixing premixed joint compound and water to form a joint compound mixture. Generally, the apparatus 10 includes a container 11 (FIGS. 1, 2, 4, and 5), a motor driven pump assembly 12 (FIG. 2), a mixing element 13 (FIGS. 1, 3, 4, and 5), a mixing element driver assembly 14 (FIGS. 1 and 2) with a motor driven drive shaft 15 (FIGS. 1, 2, 4, and 5), and a coupling 16 (FIGS. 4 and 5). Those components are supported upon a dolly assembly 17 (FIG. 1) to form a portable rig. The dolly assembly 17 includes a platform 18 on two wheels 19 and 20, although any of various other portable carts and the like may be used instead. The container 11 rests atop the platform 18, where it is secured by suitable means, and the motor driven pump assembly 12 is mounted underneath the platform 18 where it is connected in fluid communication with the container 11 and suitable distribution plumbing.

Figure 1:
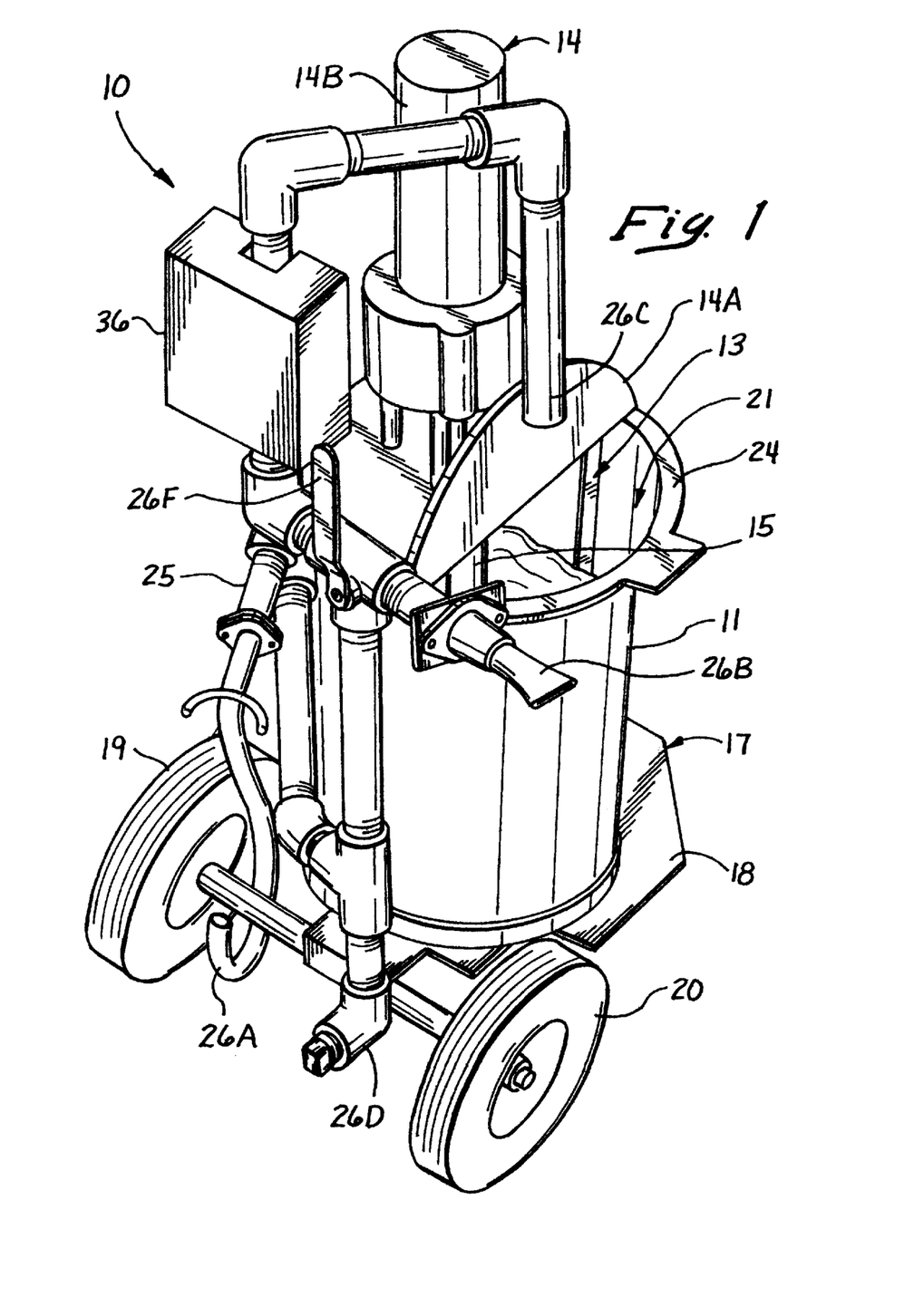
FIG. 1 of the drawings is an isometric view of an apparatus or mud mixing machine constructed according to the invention.

Consider the container 11 in further detail. An apparatus constructed according to the invention includes container means for containing the premixed joint compound and water as they are mixed to form the joint compound mixture. The illustrated apparatus 10 includes the container 11 for that purpose. The container 11 has a 7.5-gallon interior 21 (FIGS. 1, 4, and 5) extending along a central axis 22 of the container 11 (FIGS. 4 and 5) from a base portion 23 of the container 11 (FIGS. 4 and 5) to an upper lip portion 24 of the container (FIGS. 1 and 4). Any of various container configurations may be employed without departing from the inventive concepts disclosed. The illustrated container 11 takes the form of a 7.5-gallon plastic bucket with an inside diameter measuring roughly 14 inches or so, although other capacities may suffice (e.g., ten to twelve gallon containers) depending on the amount of premixed joint compound to be mixed. The 7.5-gallon size works well for a conventional 47-pound box of premixed joint compound.

Figure 2:
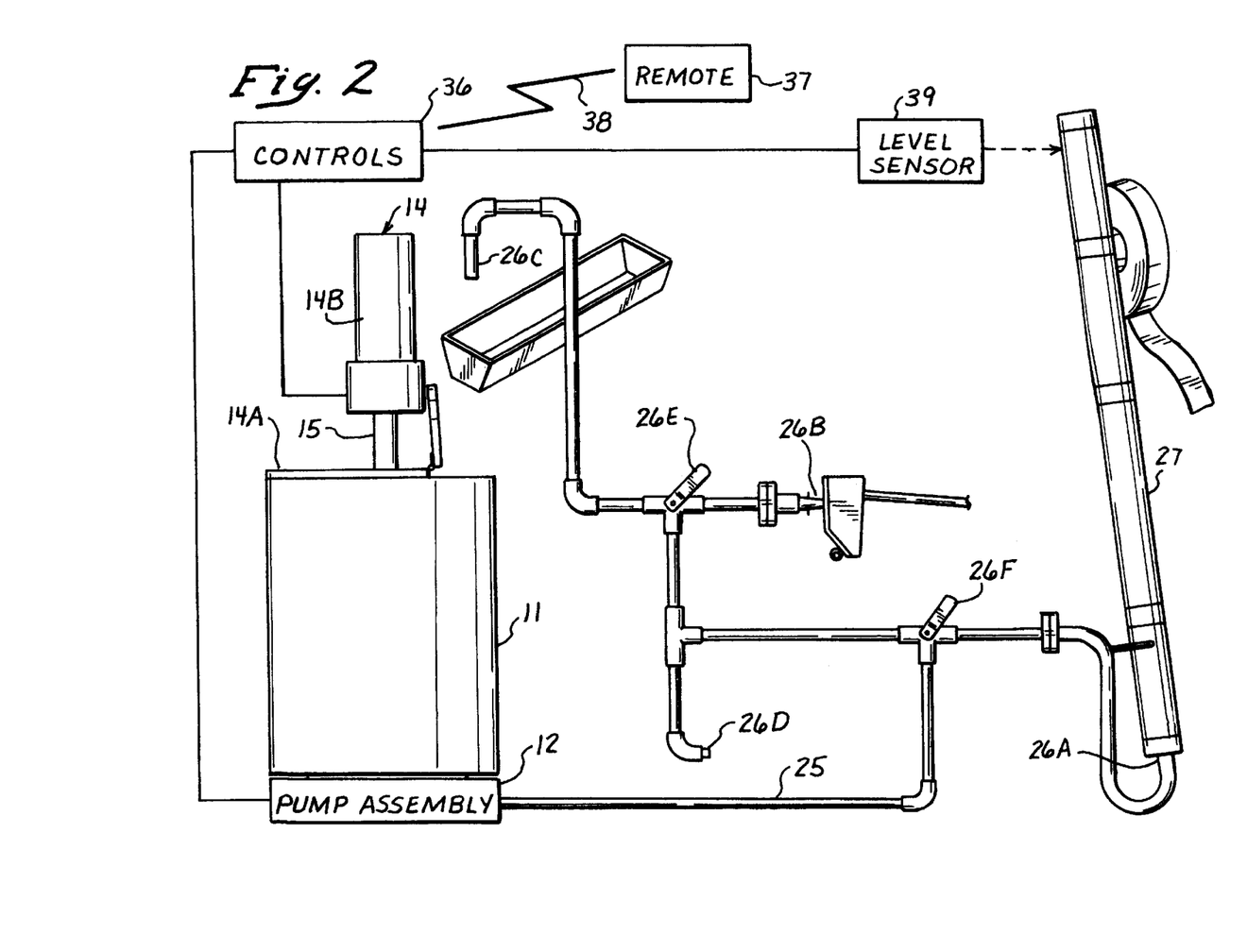
FIG. 2 is a diagrammatic representation of the apparatus that focuses on the dispensing arrangement and controls.
Figure 3:
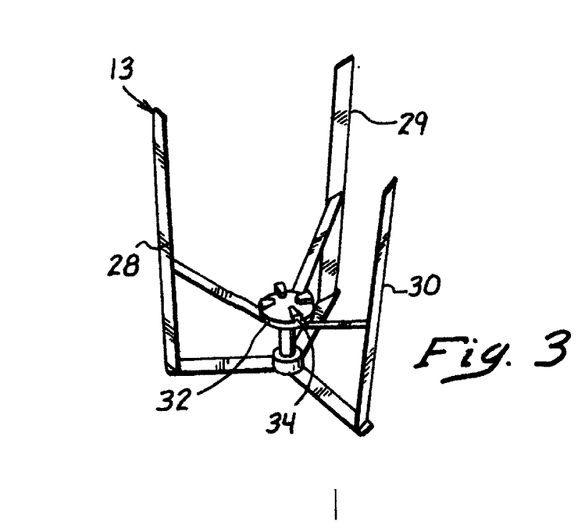
FIG. 3 is an isometric view of the mixing element.

Next consider the motor driven pump assembly 12 in further detail. An apparatus constructed according to the invention includes pumping means for pumping the joint compound mixture from the container to at least one outlet. The illustrated apparatus 10 includes the motor driven pump assembly 12 for that purpose. It takes the form of an electrically powered stator tube pump and it pumps the joint compound mixture from the container 11 through suitable plumbing 25 (FIGS. 1 and 2) to at least one outlet 26A (e.g., a conventional outlet that mates with a conventional taping tool 27). The plumbing 25 is a combination of pipes or other conduit, valves, and outlets (outlet fittings) that preferably includes various conventional valves and outlet fittings for filling other drywalling tools, including a skim box, a nail spotter tool, an angle tool, and a mud pan, for connecting to a texture spray gun, and for recirculating the mixture back into the container for additional mixing purposes. Outlets 26B, 26C, and 26D in FIGS. 1 and 2 depict these extra outlets, and valves 26E and 26F depict two conventional valves. Based upon the foregoing and subsequent descriptions, one of ordinary skill in the art can readily design and construct a motor driven pump assembly with suitable plumbing for the apparatus 10.

Next consider the mixing element in further detail. An apparatus constructed according to the invention includes mixing element means for mixing the premixed joint compound and water in the container. The illustrated apparatus 10 includes the mixing element 13 for that purpose. It is a metal structure with three vanes 28, 29, and 30 (FIG. 3) that the motor driven drive shaft 15 causes to rotate within the interior 21 of the container 11 about the central axis 22 (as depicted by an arrow A in FIG. 5) in order to mix the premixed joint compound with water to form the joint compound mixture. The mixing element 13 has a size and shape that fits within the interior 21 of the container 11 so that it can be rotated about the central axis 22 of the container 11 for mixing purposes.

During periods that the mixing element 13 is not being rotated (e.g., when the container 11 is empty and ready for premixed joint compound to be added), the mixing element 13 rests upon the base portion 23 of the container 11 under influence of gravity, as illustrated in FIG. 4. When rotated by the motor driven drive shaft 15, the mixing element rises above the base portion 23 slightly (e.g., about one-eighth inch or so) as illustrated in FIG. 5. That action is accomplished by the coupling 16 as it couples the drive shaft 15 to the mixing element 13.

Consider the mixing element driver assembly 14 and the coupling 16 in further detail. An apparatus constructed according to the invention includes mixing element driver means for rotating the mixing element within the container. The apparatus 10 includes the driver assembly 14 and its motor driven drive shaft 15 for that purpose. The driver assembly 14 is an electric motor powered unit (e.g., one-quarter horsepower electric motor) and it is adapted to rest atop the lip portion 24 of the container 11 (as illustrated in FIGS. 1, 2, and 4) with the drive shaft 15 extending along the central axis 22 of the container 11 to the mixing element 13.

An apparatus constructed according to the invention also includes coupling means for coupling the drive shaft 15 to the mixing element 13. The apparatus 10 includes the coupling 16 for that purpose, with a first coupling component 31 connected to a distal end of the drive shaft 15 and a second coupling component 32 connected to the mixing element 13. The first coupling component 31 includes four protrusions or teeth that extend downwardly at an angle to the central axis 22, while the second coupling component 32 includes four mating protrusions or teeth that extend upwardly at an angle. Only one downwardly extending protrusion 33 and one upwardly extending protrusion 34 are designated in FIG. 4 for illustrative convenience in order to keep the drawings less cluttered with reference numerals.

The protrusions angle at about thirty degrees relative to the central axis 22. When the drive shaft 15 rotates, the downwardly extending protrusions engage the upwardly extending protrusions to thereby couple rotational movement from the drive shaft 15 to the mixing element 13. In addition, when the angled protrusions engage, they also lift the mixing element 13 above the bottom portion 23 slightly. That clears the mixing element from the bottom portion with the result that the mixing element does not bind against the bottom portion and thereby impede rotation. Base upon the foregoing description, one of ordinary skill in the art can readily design and construct first and second coupling components to function as described.

In addition to the foregoing elements, a stabilizer component 35 is shown in FIG. 4. It is part of the mixing element driver assembly, and it extends downwardly into the interior 22 of the container 11. It is attached to a cover component 14A (FIGS. 1, 2, and 4) of the mixing element driver assembly 14 and it helps prevent rotation of the mixing element driver assembly 14 in a direction opposite to direction of rotation of the mixing element 13, by bearing against the joint compound mixture. The cover component 14A is attached to an electric motor component 14B as illustrated in FIG. 1 (the diagrammatic view in FIG. 2 omits the attachment for illustrative convenience) and the cover component 14A can be configured to engage or lock in position on the upper lip portion 24 of the container 11 for this purpose also, in addition to or in to place of the stabilizer component 35.

FIG. 2 shows some further details of the control aspects of the illustrated apparatus 10. Electrical control components 36 are provided and they are configured according to known techniques to control the mixing element driver assembly 14 and the pump assembly 12. Preferably, the control components 36 are configured to include switches that enable an operator to selectively turn those assemblies on and off, speed controls to enable the operator to control the speed of those assemblies, and even timing controls for automatic shutoff purposes.

A remote control component 37 is included. It serves the function of enabling an operator to control the pumping assembly 12 and the mixing element driver assembly 14 from a location removed several feet from the apparatus 10. It is configured according to known techniques to communicate operator commands to the control components 36 from a location remove several feet from the control components 36. The symbol 38 depicts any of various communication links, including cabling and infrared, that link the remote control component 37 to the control components 36.

A level sensor component 39 is also included. It is configured according to known techniques to be responsive to the joint compound mixture reaching a desired level in the tape application tool 27. When that occurs, it communicates that condition to the control components 36 in order to automatically turn the pumping means off. Any of various sensing techniques may be employed, including a sensitive microswitch with an actuator placed near a full position on the tool 27. Based upon the foregoing descriptions, one of ordinary skill in the art can readily design and construct suitable control components, remote control components, and level sensor components to function as described.

Figure 6:
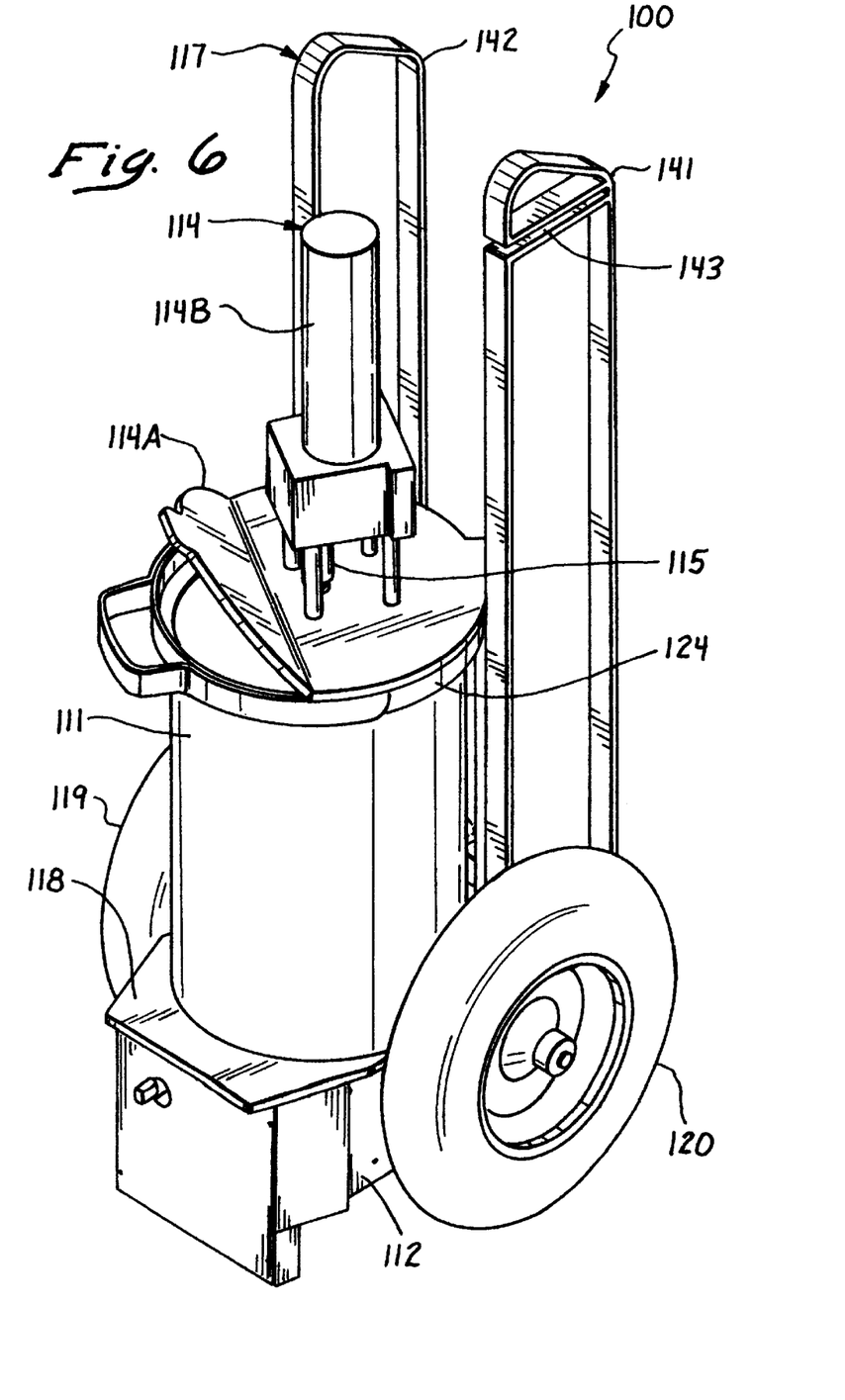
FIG. 6 is an isometric view of a further refined second embodiment of the invention.
Figure 7:
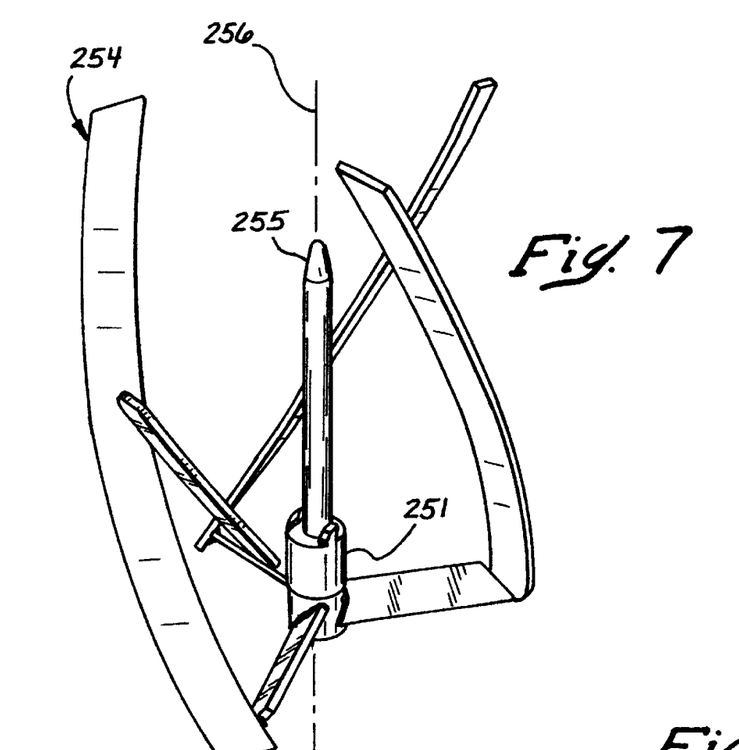
FIG. 7 is an isometric view of a second mixing element constructed according to the invention, shown with a first lower coupling component mounted on it.

FIG. 6 illustrates a second embodiment of the invention that is designated as an apparatus 100. It is similar to the apparatus 10 in many respects and so only differences are described in further detail. For convenience, reference numerals designating parts of the apparatus 100 are increased by one hundred over those designated related parts of the apparatus 10.

Similar in some respects to related parts of the apparatus 10, the apparatus 100 includes a container 111 on a platform 118 of a dolly assembly 117, together with a motor driven pump assembly 112 underneath the platform 118 and a mixing element driver assembly 114 with motor driven drive shaft 115, a cover component 114A that rests atop an upper lip portion 124 of the container 111, and a motor component 114B. It includes control components also, but they are mounted out of view in FIG. 6. One major difference is that the dolly assembly 117 has two handles 141 and 142 that extend to a height above the mixing element driver assembly 114, and at least one of the handles (the handle 141 in FIG. 6) includes a slot 143 that is shaped and dimensioned to receive a portion of the cover component 114A. That way the handle 141 can support the entire mixing element driver assembly 114 in a raised position above the container 111 so that the operator has better access to the interior of the container 111 when desired without having to move the mixing element driver assembly 114 very far.

Thus, the invention described in the parent application provides an apparatus for mixing and dispensing joint compound mixture that includes a portable container rig outfitted with an electrically powered mixing and dispensing arrangement that significantly facilitates joint compound mixing and distribution for more efficient use of worker time. Workers can continue to work while the apparatus mixes the next batch. Mixing is less messy and it has been found in extensive testing at actual job sites that the apparatus significantly speeds up the entire drywall finishing job.

Multifunction Coupler Assembly

Now consider FIGS. 7–15. They show various aspects of a coupler assembly constructed according to the invention of this continuation-in-part application. It includes an upper coupling component 250 (visible in FIGS. 9, 11, 13, and 15), a first lower coupling component 251 (visible in FIGS. 7, 9, 12, and 13), and a second lower coupling component 252 (visible in FIGS. 11, 14, and 15). These coupling components couple rotational movement from a motor driven drive shaft 253 to a mixing element 254 (FIGS. 7, 8, 9, and 11) in order to rotate the mixing element 254 for the mixing purposes previously described relative to the mud mixing apparatus 10. An operator uses the first lower coupling component 251 when he desires to leave the mixing element 254 in a container (e.g., a larger 7.5-gallon container) after mixing. He uses the second lower coupling component 252 when he desires to lift the mixing element 254 from a container (e.g., a smaller 5-gallon container) after mixing.

Figures 8, 10:
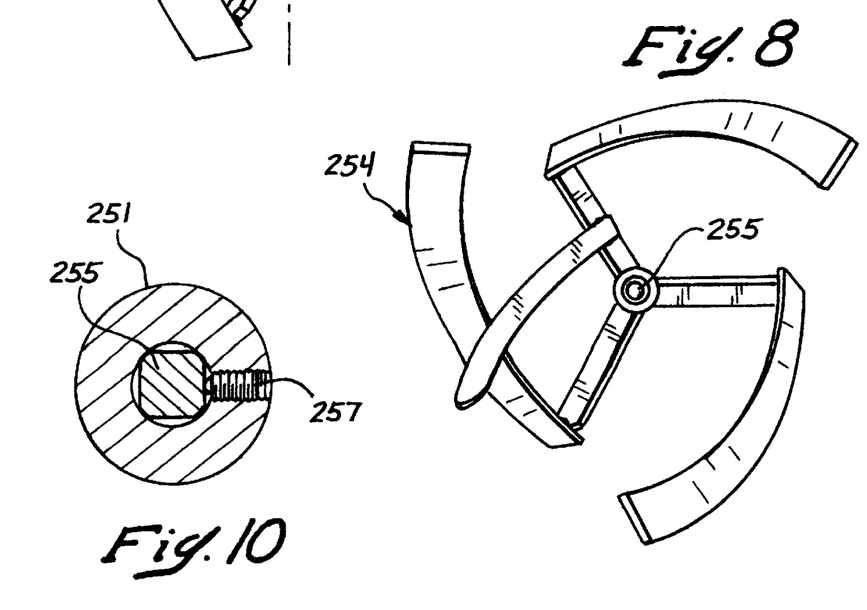
FIG. 8 is a top view of the second mixing element without the first lower coupling component.
FIG. 10 is a cross sectional view taken on line 10—10 of FIG. 9 that shows setscrew mounting of the first lower component on the second mixing element.
Figure 9:
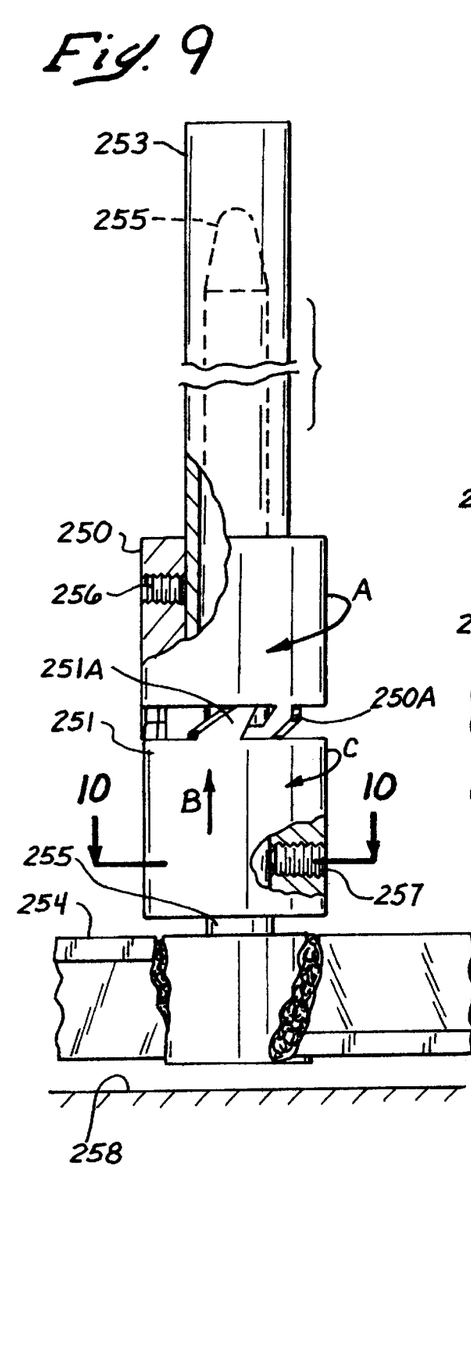
FIG. 9 is an enlarged view of the first lower coupling component on the second mixing element being engaged and raised by the upper coupling component.
Figure 11:
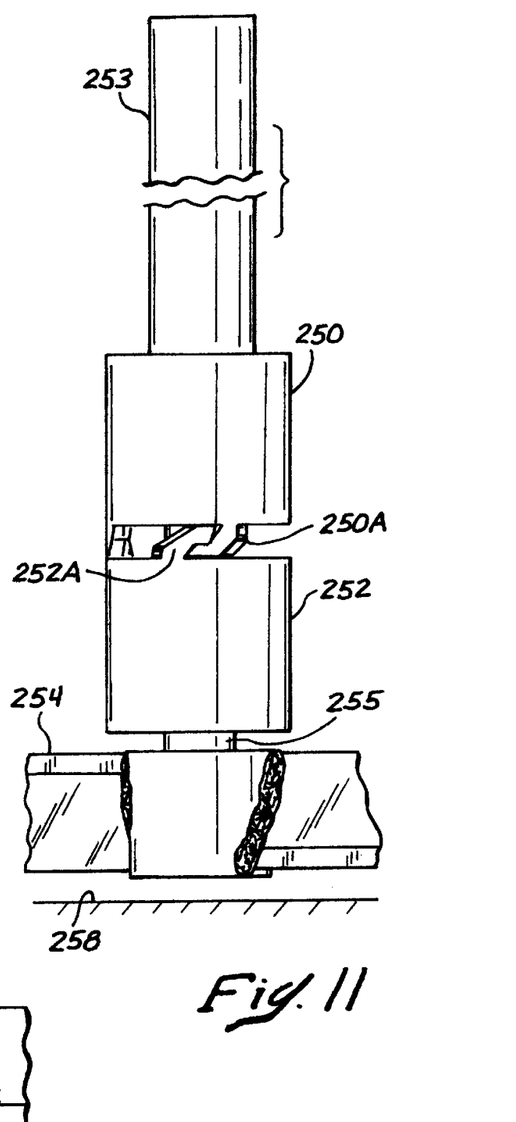
FIG. 11 is a view similar to FIG. 9 but with a second lower coupling component mounted on the second mixing element that facilitates lifting of the second mixing element from a freshly mixed batch of mud.
Figure 12:
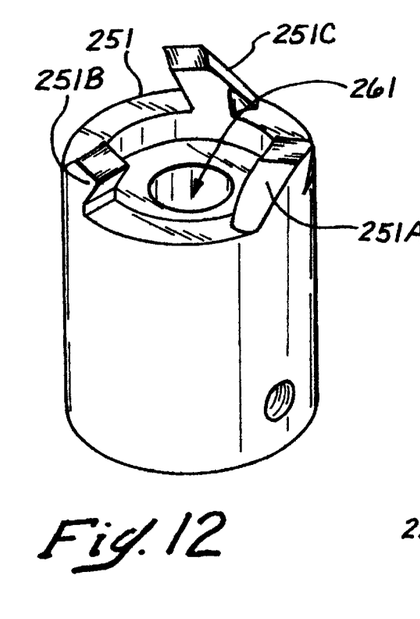
FIG. 12 is an isometric view of the first lower coupling component.

The drive shaft 253 and the mixing element 254 represent counterparts of the drive shaft 15 and mixing element 13 described previously for the mud mixing apparatus 10. The drive shaft 253 (e.g., 1.0-inch outside diameter) is hollow at least at its distal or downward end, and the mixing element 254 includes a ten-inch long shaft 255 (FIGS. 7–11) that extends along a rotational axis 256 (FIG. 7) into the drive shaft 253. The upper coupling component 250 is mounted coaxially on the drive shaft 253 using a setscrew 256 (FIGS. 9 and 10). The operator mounts a selected one of the first lower coupling 251 and the second lower coupling component 252 on the shaft 255 coaxially relative to the axis 256 using a setscrew 257 for the first lower coupling component 251 (FIG. 9), or a similar setscrew arrangement for the second lower coupling 252 (FIG. 11). The similar setscrew arrangement that is not visible in the drawings.

The selected one of the first and second lower coupling components 251 and 252 is then adjusted in vertical position on the shaft 255 by setscrew adjustment. That is done so that in operation the mixing element 254 rises slightly (e.g., about 0.15 inches) from the container bottom 258 (FIGS. 9 and 11) as the selected one of the first and second lower coupling components 251 and 252 is fully engaged by the upper coupling component 250. In the case of the first lower coupling component 251 (FIG. 9), lifting is accomplished by downwardly protruding teeth on the upper coupling component 250 contacting and applying an upward force component to upwardly protruding teeth on the first lower coupling component 251 as the upper coupling component rotates (only one upper coupling component tooth 250A and one lower coupling component tooth 251A are designated in FIG. 9). An arrow A in FIG. 9 indicates rotation of the upper coupling component 250, an arrow B indicates the resulting upward movement of the lower coupling component 251 and mixing element 254, and an arrow C indicates resulting rotational movement of the lower coupling component and mixing element. When rotation stops, the mixing element 254 lowers toward the container bottom 258 and remains in the container.

In the case of the second lower coupling component 252 (FIG. 11), lifting is accomplished by the downwardly protruding teeth on the upper coupling component 250 contacting and applying upward force to upwardly protruding teeth on the second lower coupling component 252 as the upper coupling component 250 rotates (only one upper coupling component tooth 250A and one lower coupling component tooth 252A are designated in FIG. 11). When rotation stops, the teeth of the upper coupling component 250 continue to engage the teeth of the lower coupling component 252, unless and until the upper coupling component 250 and the second lower coupling component 252 are rotated in reverse directions relative to each other. Thus, an operator can lift the mixing element 254 from the container by lifting the drive shaft 253.

Further details of the coupling components are shown in FIGS. 12–15. The first and second lower coupling components 251 and 252 are generally similar except for the shape of their teeth. The illustrated embodiments are cylindrically shaped bodies of rigid material (e.g., steel) measuring two inches axially in overall length and 1.75 inches in outside diameter. Each has a through bore (bore 261 in FIG. 12 and bore 262 in FIG. 14) with a 0.75-inch diameter just slightly larger than the outside diameter of the shaft 255 so that they can be slid onto the shaft 255. The first lower coupling component 251 in FIG. 12 includes three upwardly protruding teeth 251A, 251B and 251C on 120-degree centers (i.e., they are spaced at uniform intervals around the circumference of the component 251). The second lower coupling component 252 in FIG. 14 also includes three upwardly protruding teeth 252A, 252B and 252C on 120-degree centers (i.e., they are spaced at uniform intervals around the circumference of the component 252).

Figure 13:
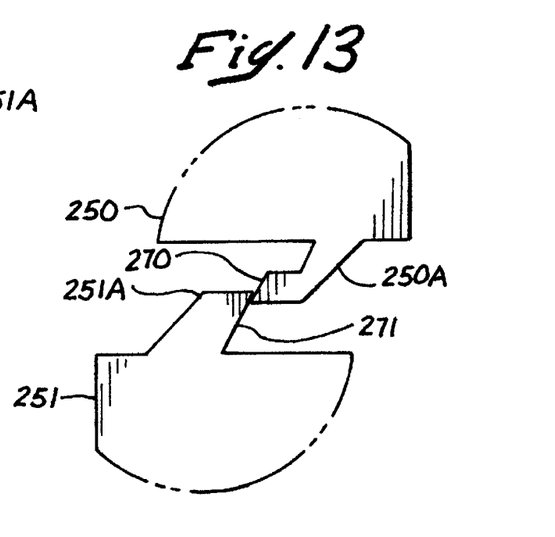
FIG. 13 is a diagrammatic representation showing the profile of one tooth of the first lower coupling component in initial contact with a tooth of the upper coupling component.
Figure 14:
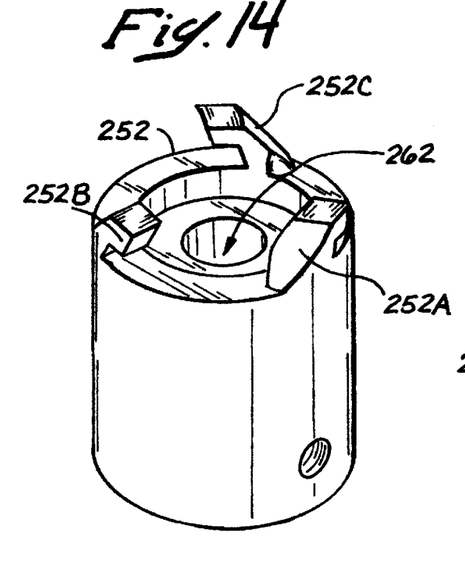
FIG. 14 is an isometric view of the second lower coupling component.

The upper coupling component 250 (FIGS. 13 and 14) is similar in most all respects to the second lower coupling component (teeth and all) and so one can refer to FIG. 14 for an indication of its appearance. The major difference is that the upper coupling component 250 includes a through bore with a slightly larger diameter than the bore 262. It is slightly larger so that fits over the one-inch outside diameter drive shaft 253. In addition, the upper coupling component 250 is used in an inverted position compared to the second lower coupling component 252 and so the teeth are referred to herein as being downwardly protruding instead of upwardly protruding.

FIG. 13 is a diagrammatic representation showing the tooth 251A of the first lower coupling component 251 in initial contact with the tooth 250A of the upper coupling component 250. One tooth of each coupling component suffices for descriptive purposes because all three teeth of the upper coupling member are similar and all three teeth of the lower coupling member are similar. The operator advances the drive shaft 253 toward the shaft 255 until the tooth 250A contacts the tooth 251A as shown. As the upper coupling component 250 rotates, an inclined surface 270 on the tooth 250A (inclined about 60 degrees to horizontal which corresponds to about 30 degrees to the rotational axis 256) transfers a circumferential component of force and an upward component of force to an inclined surface 271 on the tooth 251A. That results in the lower coupling component 251 moving upward (i.e., rising) slightly toward the upper coupling component 250 as it rotates with the upper coupling component 250. The inclined surface 271 slides upwardly across the inclined surface 270 in response to the upward component of force. When rotation stops, the lower coupling component 251 is free to drop back down toward the container bottom.

Figure 15:
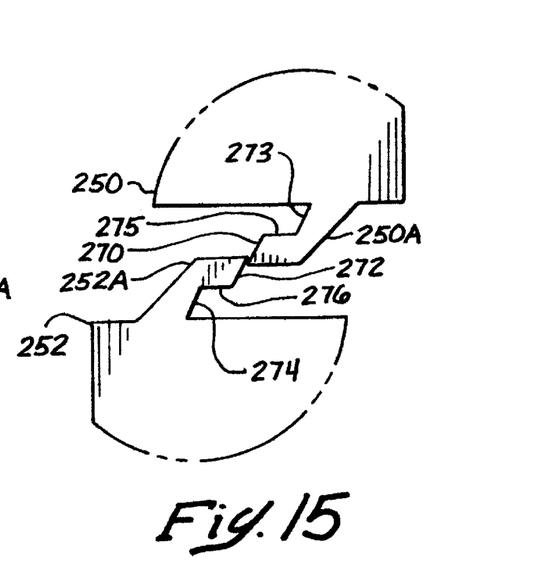
FIG. 15 is a diagrammatic representation similar to FIG. 13 showing the profile of one tooth of the second lower coupling component in initial contact with the tooth of the upper coupling component.

FIG. 15 is a diagrammatic representation showing the tooth 252A of the second lower coupling component 252 in initial contact with the tooth 250A of the upper coupling component 250. The other teeth are similar. The operator advances the drive shaft 253 toward the shaft 255 until the inclined surface 270 of the tooth 250A contacts an inclined surface 272 of the tooth 252A as shown. As the upper coupling component 250 rotates, the inclined surface 272 slides upwardly across the inclined surface 270 until the tooth 250A interlocks with the tooth 252A in the position shown in FIG. 11. When interlocked that way, the inclined surface 272 faces a surface 273 on the tooth 250A (FIG. 15), the inclined surface 270 faces a surface 274 on the tooth 252A, and an upwardly facing horizontal surface 275 on the tooth 250A faces a downwardly facing horizontal surface 276 on the tooth 252A.

When rotation stops, the lower coupling component 252 remains engaged by the upper coupling component 250, with the downwardly facing horizontal surface 276 resting upon the upwardly facing horizontal surface 275. As a result, the operator can lift the mixing element 254 by moving the drive shaft 253 upwardly. To disengage the lower coupling component 252, the operator rotates the upper coupling component 250 and the lower coupling component in opposite directions until the tooth 250A and the tooth 252A separate. Preferably, the tooth 250A and the tooth 252A are similar L-shaped members as shown.

Thus, the coupler assembly described in this continuation-in-part application improves upon the mud mixing apparatus 10 by providing a multifunction coupling assembly. The upper coupling component 250 engages the first lower coupling component 251 in a way that raises the mixing element slightly during mixing but then disengages the lower coupling component after mixing so that the mixing element remains in the container. The upper coupling component 250 engages the second lower coupling component 252 in a way that raises the mixing element slightly during mixing and holds onto the lower coupling component after mixing so that the mixing element can be lifted out of the container. Although exemplary embodiments have been shown and described, one of ordinary skill in the art may make many changes, modifications, and substitutions without necessarily departing from the spirit and scope of the invention. In addition, an apparatus constructed according to the invention may be used for mixing other compounds than powdered joint compound with water to form other slurries, and it is intended that all such uses fall within the scope of the claims. Moreover, the apparatus can, through suitable mechanical means, be powered with one motor.

What is claimed is:

1. An apparatus for mixing premixed joint compound and water to form a joint compound mixture, comprising:

container means for containing the premixed joint compound and water as they are mixed to form the joint compound mixture, including a container having an interior extending along a central axis of the container from a base portion of the container to an upper lip portion of the container;

pumping means for pumping the joint compound mixture from the container to at least one outlet, including a motor driven pump assembly in fluid communication with the interior of the container and the outlet;

mixing element means for mixing the premixed joint compound and water in the container, including a mixing element within the interior of the container that is adapted to fit within the interior of the container, to be rotated about the central axis of the container for mixing purposes, and to rest upon the base portion of the container during periods that the mixing element is not being rotated;

mixing element driver means for rotating the mixing element within the container, including a driver assembly with a motor driven drive shaft, which driver assembly includes a cover component that is adapted to rest atop the lip portion of the container with the drive shaft extending along the central axis of the container to the mixing element;

coupling means for removably coupling the drive shaft to the mixing element, including a coupling adapted to engage and raise the mixing element above the base portion of the container slightly when the drive shaft rotates; and dolly means for portably supporting the container means, pumping means, mixing element means, mixing element driver means, and coupling means, said dolly means defining a slot that is shaped and dimensioned to receive a portion of the cover component in order to function as means for holding the driver assembly in a position raised above the upper lip portion of the container;

wherein the coupling means includes (i) an upper coupling component mounted on the drive shaft, and (ii) a selected one of a first lower coupling component adapted to be mounted on the mixing element by a user when the user desires to leave the mixing element in the container after mixing the joint compound mixture, and a second lower coupling component adapted to be mounted on the mixing element by the user when the user desires to lift the mixing element from the container after mixing the joint compound mixture;

wherein the upper coupling component and the first lower coupling component are adapted to cooperatively (i) couple rotational motion from the drive shaft to the mixing element, (ii) raise the mixing element slightly as the rotation motion is coupled to the mixing element, and (iii) release the mixing element when the rotational motion stops; and wherein the upper coupling component and the second lower coupling component are adapted to cooperatively (i) couple rotational motion from the drive shaft to the mixing element, (ii) raise the mixing element slightly as the rotational motion is coupled to the mixing element, and (iii) continue to engage the mixing element after the rotational motion stops in order to enable the user to lift the mixing element out of the container by moving the drive shaft upwardly.

2. An apparatus as recited in claim 1, further comprising remote control means for enabling an operator to control the pumping means and the mixing element driver means from a location removed several feet from the apparatus.

3. An apparatus as recited in claim 1, further comprising level sensor means responsive to the joint compound mixture reaching a desired level in a tape application tool for automatically turning the pumping means off.

4. A coupler for removably coupling a motor driven drive shaft to a mixing element in a container for purposes of mixing a compound and a liquid in the container to form a mixture, the coupler comprising:

an upper coupling component mounted on the drive shaft; and a first lower coupling component adapted to be mounted on the mixing element by a user when the user desires to leave the mixing element in the container after mixing the mixture;

the upper coupling component and the first lower coupling component being adapted to cooperatively (i) couple rotational motion from the drive shaft to the mixing element, (ii) raise the mixing element slightly as the rotation motion is coupled to the mixing element, and (iii) release the mixing element when the rotational motion stops;

the upper coupling component including at least one downwardly protruding first tooth with a first inclined surface;

the first lower coupling component including at least one upwardly protruding second tooth with a second inclined surface; and the first inclined surface of the first tooth and the second incline of the second tooth of the first lower coupling component being so disposed that the first inclined surface of the first tooth contacts and imparts an upward force component to the second inclined surface of the second tooth of the first coupling component when the upper coupling component is rotated.

5. A coupler for removably coupling a motor driven drive shaft to a mixing element in a container for purposes of mixing a compound and a liquid in the container to form a mixture, the coupler comprising:

an upper coupling component mounted on the drive shaft; and a second lower coupling component adapted to be mounted on the mixing element by the user when the user desires to lift the mixing element from the container after mixing the mixture;

the upper coupling component and the second lower coupling component being adapted to cooperatively (i) couple rotational motion from the drive shaft to the mixing element, (ii) raise the mixing element slightly as the rotational motion is coupled to the mixing element, and (iii) continue to engage the mixing element after the rotational motion stops in order to enable the user to lift the mixing element out of the container by moving the drive shaft upwardly;

the upper coupling component including at least one downwardly protruding first tooth with a first inclined surface and a first horizontal surface;

second lower coupling component including at least one upwardly protruding second tooth with a second inclined surface and a second horizontal surface;

the first inclined surface of the first tooth and the second inclined surface of the second tooth of the second lower coupling component being so disposed that the first inclined surface of the first tooth contacts and imparts an upward force component to the second inclined surface of the second tooth of the second coupling component when the upper coupling component is rotated; and the first horizontal surface of the first tooth and the second horizontal surface of the second tooth of the second coupling component being so disposed that the second horizontal surface of the second tooth of the second coupling component rests upon the first horizontal surface of the first tooth when rotation stops.

* * * * *